March 11, 1969  J. C. CLEMENT  3,431,761
TWO-DIMENSIONAL MATERIAL PROPERTY CONTROL SYSTEM
Filed March 25, 1964
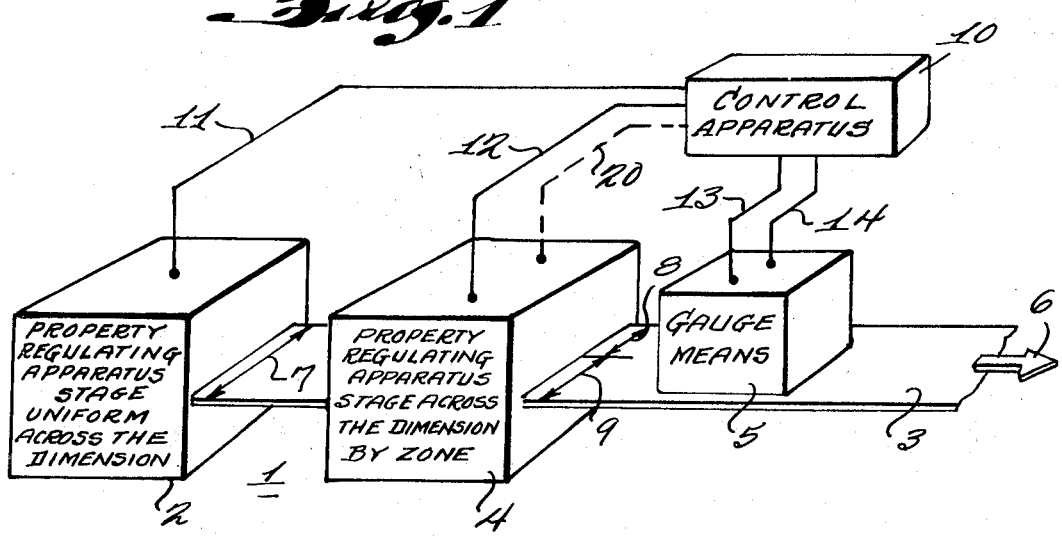
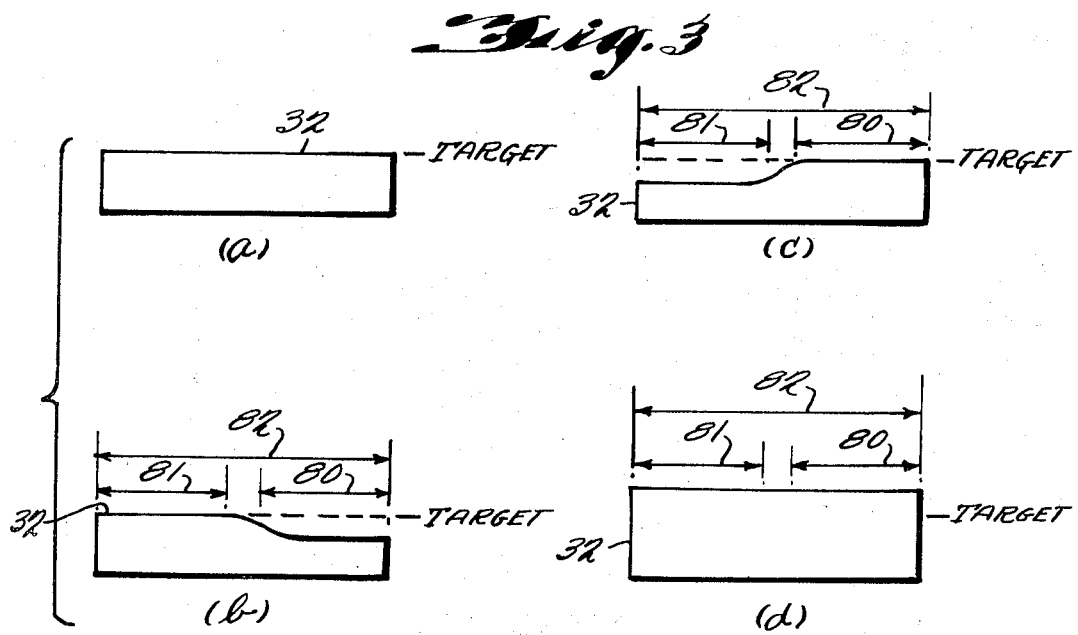
INVENTOR
JOHN C. CLEMENT
BY William T. Fryer III
ATTORNEY

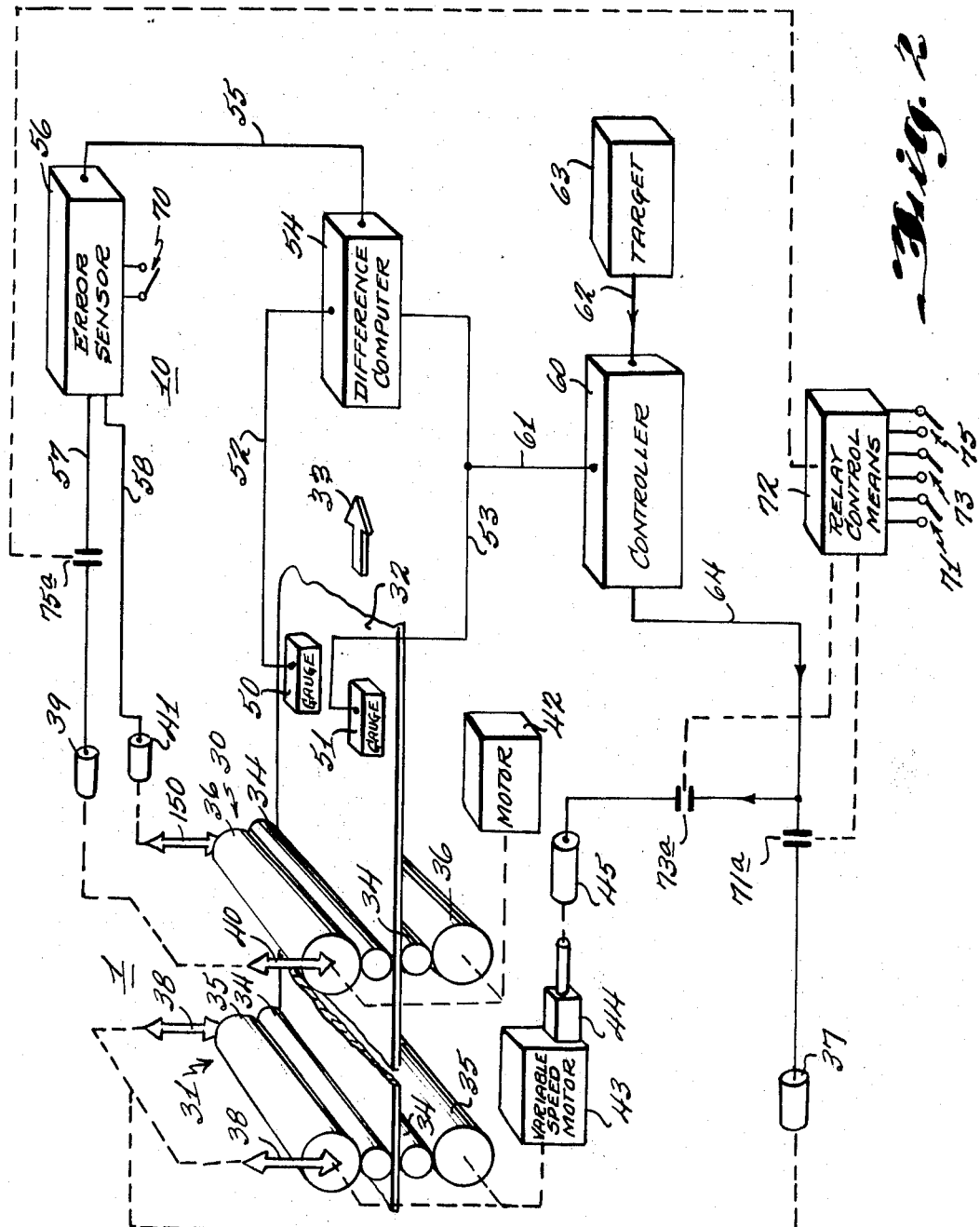

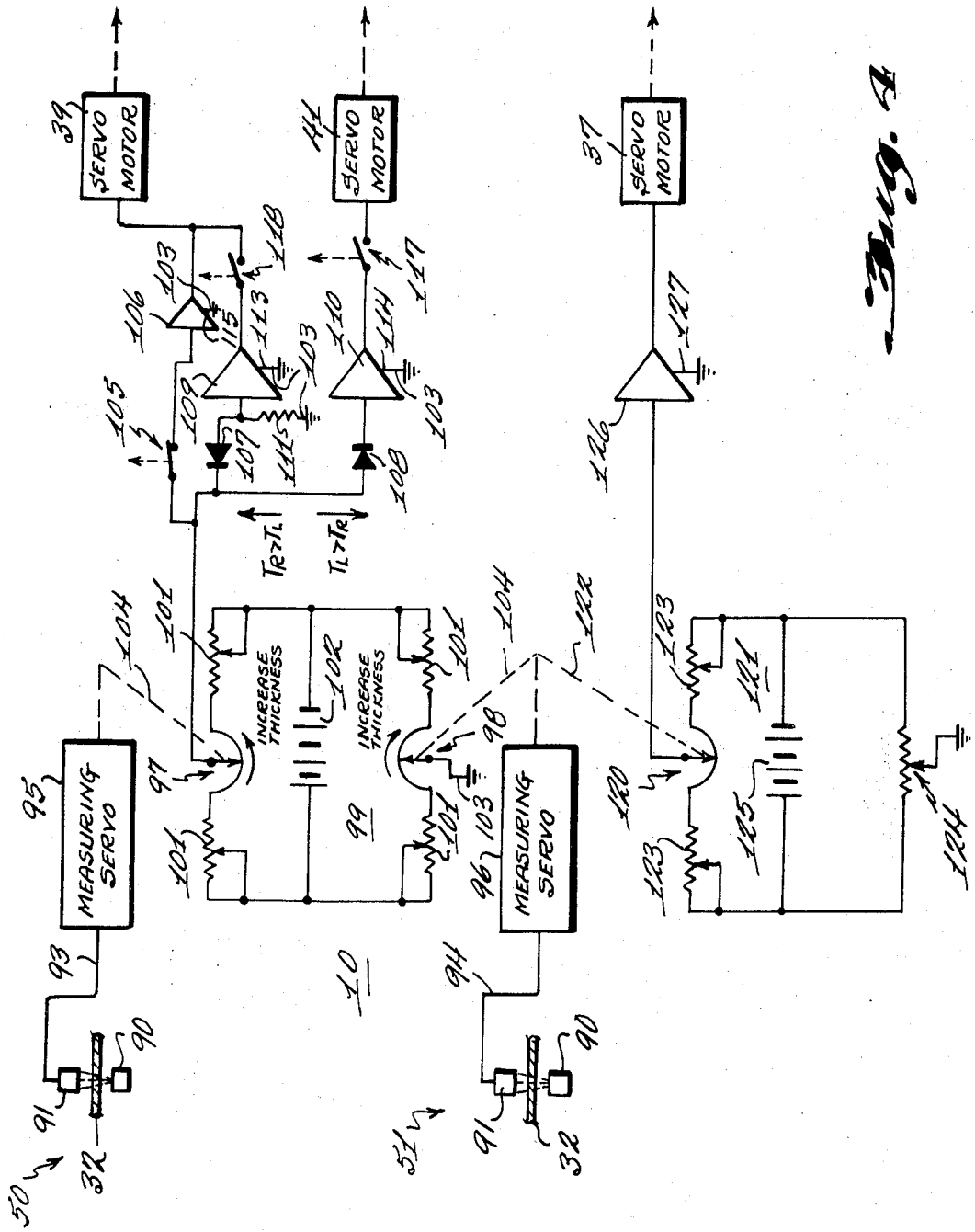

United States Patent Office 3,431,761
Patented Mar. 11, 1969

3,431,761
TWO-DIMENSIONAL MATERIAL PROPERTY
CONTROL SYSTEM
John C. Clement, Devon, Pa., assignor to Industrial Nucleonics Corporation, a corporation of Ohio
Filed Mar. 25, 1964, Ser. No. 354,727
U.S. Cl. 72—9   18 Claims
Int. Cl. B21b 37/02, 37/14

The present invention relates to method and apparatus for controlling an industrial system. More particularly, the present invention is concerned with controlling the uniformity of a material property.

The present invention has application to many industrial systems that modify or create a material property. In the preferred embodiments disclosed herein the present invention is applied to the control of material thickness. The other applications of the present invention are apparent, differing only in the substitution of known apparatus that functions to regulate another material property in the manner set forth by the present invention.

An example of apparatus that regulates material thickness is in a metal rolling mill where a metal strip passes through successive stands that can be controlled to change the metal thickness in individual zones partially across the width and also uniformly change the thickness across the entire material width. This type of apparatus has been controlled by several methods and control apparatuses to achieve a uniform thickness across the material width (also termed profile) and in the machine direction. Probably the principal approach to date has been to use separate gauges to measure the strip thickness at different points and to compare each indicated thickness with a separate fixed target. This approach has involved at least three measurements and often did not result in a rapid correction of thickness irregularity. It was especially difficult using this approach to distinguish from a machine direction variation or a profile variation and to energize only the portion of the regulating apparatus that could correct the irregularity in the shortest time.

Accordingly, it is an object of the present invention to provide method and control apparatus for maintaining a uniform property in a material with a minimum number of measurements.

It is a further object of the present invention to provide method and control apparatus for maintaining a uniform property in a material that rapidly corrects for a a property irregularity.

It is a further object of the present invention to provide method and apparatus that enables the control of a regulating apparatus in one manner when the irregularity is only due to machine direction change and in another manner when the irregularity is only due to profile change.

It is a still further object of the present invention to provide an apparatus that controls a regulating apparatus with a minimum number of gauges.

It is another object of the present invention to provide an apparatus that controls a regulating apparatus to correct rapidly for irregularities in a material property.

It is a further object of the present invention to provide a control apparatus that continuously corrects for both machine direction and profile property variations and selects the appropriate regulating apparatus to initiate the necessary corrective action.

These objects, and other objects that will be apparent from the following description of preferred embodiments, are achieved by the method and apparatus of the present invention. In one application, the disclosed method of maintaining a uniform property across a material dimension is practiced using an apparatus having at least one control operable to vary separately the property in a one zone partially across the material dimension and another control operable to vary uniformly the property across the material dimension including the one zone and an adjacent zone. The method in one form comprises the steps of measuring the property in the zones and comparing the measured property in each of the zones. The one control is adjusted to change the property in its respective zone to equal the property measured in the other zone. The measured property in one of the zones is compared with a property target and the control that changes the property uniformly across the material dimension is adjusted to change the material property from the measured property to the target property.

The control apparatus of the present invention in one embodiment comprises means for separately regulating the property in an individual zone partially across the dimension of the material and means for uniformly regulating the property across the material dimension including the individual and an adjacent zone. Gauge means is provided for indicating the property in the individual zones. A control means is coupled to the gauge means to compare the indicated property in the individual zones and to initiate a control action by the separately regulating means that changes the property in the individual zone to make the indicated property in the individual zone substantially equal to the property in the adjacent zone. The control means also compares the indicated property in one of the individual zones with a target property and initiates a control action by the uniformly regulating means that changes the property uniformly across the material dimension to the target property.

A description of the preferred embodiments of the present invention commences, reference being made to the drawings, wherein, FIG. 1 is a perspective view of a control system in block diagram form for practicing the method of the present invention.

FIG. 2 shows a perspective view of two rolling mill stands that can be arranged in several combinations with a dual control apparatus to illustrate the method and several embodiments of control apparatuses in accordance with the present invention.

FIGS. 3(a) through (d) are a series of cross-section elevation views through a material strip at right angle to the machine direction to illustrate how the method and control apparatuses of the present invention respond to certain thickness variations.

FIG. 4 is a circuit diagram for one embodiment of the control apparatus shown in FIG. 2.

As mentioned previously, the present invention has application to regulating apparatuses for many types of properties, such as weight, moisture, density, and others. The use of thickness in the following description of the preferred embodiments is by way of example only. However, uniform thickness is particularly important in the production of plastics, rubber, and metals and other materials.

In general, the present invention utilizes the idea that control of the regulating apparatus can be achieved by making only two measurements. By comparing these measurements in a particular way with each other and with a target property the regulating apparatus can be controlled to correct rapidly for any property variation. In the control system of FIG. 1, this is accomplished as follows. First, apparatus 1 is controllable to uniformly change a property of the material strip 3, such as thickness, across a material dimension, here the entire material width 7. Second, the regulating apparatus 1 is controllable to change separately the property in at least one individual zone partially across the material dimension, here the material width zones 8 and 9. The aforementioned functions are performed in the embodiment of FIG. 1 by regulating stages 2 and 4, respectively. Material strip 3 leaves regulating stage 2, where a uniform property change across the entire strip width is controllable, and moves through regulating stage 4 where the property in zone 9 is separately controllable. Following regulating stage 4 material strip 3 passes under gauge means 5 in the direction of arrow 6.

The relative positions of regulating stages 2 and 4 can be interchanged or one regulating apparatus stage having both of the aforementioned functions can be employed and the individual zones need not have a common boundary as shown, so that an intermediate, nonpredominately controlled zone can exist. The word "separately" is used to mean that the property in any one of individual zones 8 and 9 can be varied predominantly with respect to the other zones, but does not mean that the adjacent zone(s) cannot be affected to a lesser extent than the indivdual zone when the change in the selected individual zone occurs.

Gauge means 5 takes two measurements simultaneously across the material dimension, the width, at space locations to indicate the property in each of zones 8 and 9. This information is fed to a control apparatus 10 over lines 13 and 14 which processes the information and initiates appropriate control action(s) over line 11, if necessary, to regulating stage 2 to uniformly change the property and over line 12 to regulating stage 4 to change separately the property in zone 9.

The control action(s) initiated by control apparatus 10 depend on a comparison of the two measurements for any one time to determine if the measured property in zones 8 and 9 are equal. Regulating stage 4 is not energized to change the property in zone 8 if the indicated property in zone 8 substantially equals the indicated property in zone 9. At the same time the indicated property from one of zones 8 and 9 is compared with a target property, and if there is an equality, regulating stage 2 is not energized to change the property uniformly across the material width. Assuming that the measured property in zones 8 and 9 are not equal, control apparatus 10 energizes regulating stage 4 to change the property in zone 9 until a substantial equality exists. With an inequality between the indicated zone properties, control apparatus 10 energizes regulating stage 2 to uniformly change the property across the material width only when the indicated property that is compared with the target property is different from the target property. The uniform change is such as to make the compared indicated property substantially equal to the target property.

The term "equality," when referring to the comparison of property indications with each other and the target property, is meant to describe a close equality, not necessarily an exact identity. Human response, apparatus lags, or apparatus dead-bands can be accepted, the aim of the comparison always being to achieve a substantial equality and a resultant substantial uniformity of the property in the material.

In another form of the present invention, again referring to FIG. 1, the control apparatus 10 also can energize regulating stage 4 over line 20 (dotted) to change separately the property in zone 8. The control action initiated over lines 12 and 20 is such that the property is changed only in the same direction. When an inequality exists between the property indications, control apparatus 10 acts to either increase the property in the zone with the lesser property or decrease the property in the zone with the greater property, but both actions are not initiated. For example, assuming the property is only increased, when an inequality exists and zone 8 has the greater property, control apparatus 10 acts to increase the property in the zone 9 with the lesser property. If the property in zone 8 becomes less than the property in zone 9, the property in zone 8 is increased. In the case of only decreasing the property, if the property in zone 8 is greater than the property in zone 9, the property in zone 8 is decreased. When the property in zone 9 is greater than zone 8 the property in zone 9 is decreased. In each instance the control action adjusts the property in the zones 8 and 9 to substantial equality. The control of regulating stage 2 occurs simultaneously, if necessary, the same as previously described.

The regulating apparatus 1 can take several forms, even when considering the control of a material thickness. For example, as shown in FIG. 2, the regulating apparatus 1 can comprise a series of rolling mill stands 30 and 31 of conventional design for forming a metal strip 32. Strip 32 moves in the direction of arrow 33, initially being a thick narrow strip. Each of stands 30 and 31 has work rolls 34 that engage metal strip 32 and a pair of backing rolls 35 and 36 respectively.

For the purpose of illustrating several preferred embodiments of the control apparatus for the present invention, stands 30 and 31 are shown with several adjustments to control the thickness of strip 32. All of the adjustments are not needed in any one regulating apparatus. Stand 31 includes a mechanism (not shown) for uniformly adjusting either increasing or decreasing the spacing between the work rolls 34 along their length and thereby uniformly changing the thickness across the entire strip width. The uniform adjustment can be controlled by a motor, such as servomotor 37 to separate the work rolls 34 of stand 31 in the directions indicated by arrows 38. Stand 30 can have a mechanism (not shown) for adjusting, either increasing or decreasing, the spacing between the work rolls 34 at one end, and thereby separately changing the thickness in a zone partially across the strip width near this edge. The spacing adjustment can be controlled by a motor, such as servomotor 39 in the directions indicated by arrows 40. The spacing between the opposite end of work rolls 34 in stand 30 can be adjusted, either increased or decreased, by a mechanism (not shown) controlled by a motor, such as servomotor 41, to change the spacing in the directions as indicated by arrows 150. A corresponding separate change in strip thickness occurs in a zone of the strip width near this edge.

The spacing adjustment mechanisms (not shown) can be of several conventional kinds. For example, the pressure on one of the backing rolls 35 or directly on one of work rolls 34 in each stand can be changed to alter the pressure between the work rolls 34, by a hydraulic controlled system. The servomotors can be coupled to valves arranged to control separately the pressure on each end of a backing roll 35 or to change equally the pressure on each end of backing roll 35 to provide the uniform adjustment. As another example, the position of a carriage holding a roll can be controlled at each end to provide the spacing adjustments.

The relative speeds of the stands 30 and 31 can be adjusted to introduce draw and thereby uniformly change the thickness across the width of strip 32. Stand 30 has its backing rolls 36 driven together at a constant speed by motor 42. The backing rolls 35 of stand 31 are driven together by a motor 43 having a speed adjusting potentiometer 44 controlled by a servomotor 45.

Several other means of controlling the spacing, either at the ends or uniformly, between material forming rolls are known and can be used with the present invention. For example, roll bending can be used to change separately the thickness in individual zones and the control of take away speed of the first or a preceding stand can be used to change the strip thickness uniformly.

The various adjustments of the stands 30 and 31 are actuated by control apparatus 10. In the illustration of FIG. 2 several combinations of adjustments can be used to practice the present invention. In each of the combinations the first step is the measurement of the strip thicknesses following formation by stands 30 and 31 in the zones at opposite edges of the strip 32. The measurements are made by gauges 50 and 51 which continuously provide separate indications by an output signal over lines 52 and 53 respectively proportional to the strip thickness in their respective zones. These gauge output signals are compared by a difference computer 54 that provides an output signal over line 55 indicating, and proportional to, the difference between the gauge output signals. The output signal of difference computer 54 is coupled to an error sensor 56 that determines which zone should be changed separately and initiates the control action over one of lines 57 and 58 to servomotors 39 and 41 respectively, depending on which form of control is selected.

The thickness indication from gauge 51 is simultaneously coupled over line 61 to a controller 60 that compares the measured thickness with a target thickness, represented by a target signal received over line 62 from target source 63. Controller 60 provides an output signal over line 64 if an inequality exists between the target thickness and the measured strip thickness. The controller output signal energizes one of two adjustments in the proper manner to make the measured strip thickness equal to the target thickness.

The operation of control apparatus 10 in one arrangement adjusts only the thickness in one strip zone and the uniform thickness across the strip width. Error sensor 56 is arranged, by keeping the associated switch 70 open (representing one arrangement of one or more contacts) to provide a control signal over line 58 that energizes servomotor 41 in one direction when the strip thickness in the associated zone must be increased to have the thickness in the two zones equal. When the zone thickness in the associated zone must be decreased to have the thickness in the two zones equal, servomotor 41 is energized in the opposite direction. This control is continuous to maintain the zones at substantially the same thicknesses. Simultaneously witht he zone thickness change, controller 60 energizes servomotor 37 through contact 71a, closed when switch 71 of relay control means 72 is closed. The spacing between work rolls 34 of stand 31 is adjusted in the direction that changes the strip thickness to equal the target thickness. Alternatively, the same effect can be provided by keeping contact 71a open and closing contact 73a, that couples the controller output to servomotor 45. Contact 73a is closed by closing switch 73 of relay control means 72. The speed of work rolls 34 in stand 31 relative to the speed of the work rolls 34 in stand 30 is altered to change the strip thickness to the target thickness. Either contact 71a or 73a is always closed for simultaneous adjustment of the uniform strip thickness to target and the substantial equalization of the zone thicknesses.

The adjustment of regulating apparatus 1 in the manner just described is rapid and unique for each type of thickness change. Profile thickness changes are immediately differentiated from machine direction thickness changes and the adjustments are all referenced to one instantaneous thickness indication from a zone to permit continuous adjustment for machine direction variation and simultaneous adjustment for profile variations.

The operation of control apparatus 10 in another arrangement adjusts the strip thickness in each zone and uniformly across the strip width. Switch 70 of error sensor 56 is closed (representing another arrangement of one or more contacts). Error sensor 56 has an output over line 58 only when the thickness indications have a certain relationship, i.e., one greater than the other, and over line 57 only when the thickness indications have the opposite relationship. The error sensor output over line 57 energizes servomotor 39, contacts 75a being closed by closing switch 75 of relay control means 72. The zone thickness change can be based on one of two bases. First, if it is desired to only increase the thickness in the zone with the lesser thickness, then only the servomotor that adjusts the zone with the indicated lesser thickness is energized in proportion to the difference to bring the zones to substantially equal thickness. This approach eliminates the problem of bringing the work rolls too close together. Alternatively, the zone thicknesses can be changed on the basis that the zone with the greater thickness is reduced to equal the lesser zone thickness. Error sensor 56 can provide the appropriate control signals to energize servomotors 39 and 41 in whichever manner is desired.

As a further explanation of the operation of control apparatus, typical profiles of strip 32 are shown in FIG. 3. FIG. 3a shows a uniform strip thickness at target thickness in profile and machine direction. If the thickness of zone 80 (FIG. 3b) decreased and the thickness of zone 81 remains at target thickness the control apparatus 10 (assuming only the thickness of zone 81 can be adjusted) will decrease the thickness of zone 81. At the same time (assuming that the thickness indication from 80 is compared with target thickness) the uniform thickness across strip width 82 is increased. The strip is returned rapidly to target thickness in profile and machine direction. In the other arrangement of control apparatus 10 (assuming the thickness of the zone of lesser thickness is always increased to equal the thickness of the zone of greater thickness) the thickness of zone 80 would be increased and the uniform thickness would momentarily increase the strip thickness and then return to target thickness.

With the strip profile shown in FIG. 3c, given the conditions mentioned above, the thickness of zone 81 is increased and no change in machine direction thickness occurs. The profile shown in FIG. 3d illustrates a change in machine direction but no change in profile. The thickness indications from the zones are equal and no separate correction of the thickness in either zone 80 or 81 occurs. The strip thickness is uniformly decreased across the width 82 to target thickness.

One of several suitable circuits for the control apparatus 10 is illustrated in FIG. 4. The same reference numerals are used for corresponding parts described previously. The general function of error sensor 56 (FIG. 2) is provided by the circuit in FIG. 4, but the circuit arrangement of FIG. 4 differs somewhat from the system of FIG. 2. Gauges 50 and 51 can be of the non-contacting type, such as a transmission gauge comprising a radioactive source 90 and a radiation detector 91 on opposite sides of strip 32 at the respective individual zones. The output from the detectors 91 appears on lines 93 and 94 respectively and are coupled to individual measuring servos 95 and 96 respectively, a conventional arrangement.

A nuclear gauge responds both to thickness and composition and, assuming a constant composition, the gauge output signal is a measure of thickness. Frequently, even though the measurement is of material thickness, the indication is referred to in units of weight per unit area. The present invention includes the measurement of thickness in units of weight per unit area and the term thickness is used broadly to cover this and any similar type of measurement.

Measuring servos 95 and 96 each drive the arm of a different repeat slidewire potentiometer 97 and 98 respectively (as indicated by dotted lines 104) in a D.C. bridge 99. Repeat slidewire potentiometers 97 and 98 each have fixed opposite ends connected to one end of separate adjustable resistors 101 and the opposite end of two of the adjustable resistors are connected together and to one terminal of a D.C. source 102. The opposite end of the D.C. source 102 is connetced to the junction of the unattached ends of the other adjustable resistors 101.

Bridge 99 functions as a difference computer and as all or part of an error sensor to control the proper adjustment in the regulating apparatus 1. The arm of repeat slidewire potentiometer 98 is connected to ground 103 and the arm of repeat slidewire 97 is connected through switch 105 and amplifier 106 to servomotor 41 and also to unidirectional signal responsive devices, such as diodes 107 and 108. Diodes 107 and 108 have a respective anode and cathode in common and the anode of diode 107 is connected to one input terminal of an amplifier 109 having an input resistor 111 connected to ground 103. The cathode of diode 108 is connected to one input terminal of an amplifier 110 having an input resistor 112 connected to ground 103. The other input terminals 113 and 114 of amplifiers 109 and 110 respectively are connected to ground 103. Amplifier 106 has its other input terminal 115 connected to ground 103. The output of amplifier 110 is coupled through a switch 117 to servomotor 39 and the output of amplifier 109 is coupled through switch 118 to servomotor 39.

Bridge 99 is so arranged with measuring servos 95 and 96 that, when the measured thicknesses of strip 32 at the individual zones are equal or substantially equal the potential at the arms of repeat slidewire potentiometers 97 and 98 are equal. With this condition the signals at the input of amplifiers 106, 109, and 110 are zero. When switch 105 is closed and switches 117 and 118 are open, the signal coupled to servomotor 41 is proportional to the difference between the measured thicknesses and of a different polarity when one zone is greater than the other zone. Servomotor 41 is arranged to change its associated regulating apparatus adjustment to make the zone thickness equal to the other indicated zone thickness. When the thickness of the zones are equal the signal coupled to servomotor 41 will be zero and no further zone thickness adjustment occurs.

Both servomotors 39 and 41 can be energized to change their associated regulating adjustments in a desired manner, as explained in detail previously. Switch 105 is opened and switches 117 and 118 are closed. An output signal from amplifier 109 occurs only when the thickness of one zone is greater than the other, and the output signal from amplifier 110 occurs only when the thickness of the other zone is greater than the thickness of the one zone. By establishing the relationship of the bridge output signal to the particular zones the servomotors 39 and 41 can be arranged to adjust the zone with the lesser thickness to equal the zone with the greater thickness or the converse. All that is necessary is to reverse the polarity of the diodes 107 and 108.

At the same time the zones across the strip width are being brought to substantial equality, the output signal from gauge 51 is controlling the uniform adjustment of regulating apparatus 1. Measuring servo 96 also drives (as indicated by dotted line 122) a repeat slidewire potentiometer 120 of a DC bridge 121. Bridge 121 is completed by adjustable resistors 123 connected at one end to the fixed ends repeat slidewire potentiometer 120 and at the other ends across the fixed ends of a target potentiometer 124 and a DC source 125. The arm of target potentiometer connected to ground 103 and the arm of repeat slidewire potentiometer 120 is coupled to one input terminal of an amplifier 126 having its other input terminal 127 connected to ground 103.

Measuring servo 96 and bridge 121 are so arranged that when the thickness measured by gauge 51 is equal to the target thickness, set by the arm of target potentiometer 124, the potential difference between the arms of target potentiometer 124 and repeat slidewire potentiometer 120 is zero and the input to amplifier 126 is zero. The output signal from amplifier 126 is coupled to servomotor 37 (or 45) which is not energized when this condition exists. However, when the indicated thickness and target thickness are not equal or substantially equal, the input signal at amplifier 126 is proportional to the difference and has a polarity indicating which thickness is greater. Servomotor 37 (or 45) energizes the adjustment that uniformly changes the strip thickness to the target thickness.

The method of the present invention can be practiced on many forms of regulating apparatuses and by several control apparatuses to achieve the advantages of consistent and rapid adjustment of a material property to a uniform target property in the profile and machine direction. The control apparatuses of the present invention are unique and of individual significance by automatically controlling the material property with a relative small amount of equipment and by being adaptable to numerous types of regulating apparatuses.

The present invention having been described by only a few embodiments is not limited thereto. Modifications, rearrangements, and substitutions can be made without departing from the scope of the present invention as defined in the appended claims.

What is claimed is:

1. A method of maintaining a uniform property across a material dimension using apparatus having at least one control operable to vary separately the property in a zone partially across the material dimension and another control operable to vary uniformly the property across the material dimension including said zone and an adjacent zone, comprising the steps of,
   measuring the property in each of said zones,
   comparing the measured property in each of said zones,
   adjusting only said at least one control to change the property in its respective zone to equal the property measured in said adjacent zone,
   comparing the measured property in one of said zones with a property target,
   adjusting said another control to change uniformly the property across the material dimension from said measured property to said target property.

2. A method of maintaining a uniform property across a material dimension using apparatus having at least two controls each operable to vary separately the property in a different zone partially across the material dimension and another control operable to vary uniformly the property across the material dimension including each of said different zones, comprising the steps of,
   measuring the property in each of said zones,
   comparing the measured property in each of said zones,
   adjusting only one of said at least two controls to change the property in its respective zone to equal the property measured in the other of said zones,
   comparing the measured property in one of said zones with a property target,
   adjusting said another control to change uniformly the property across the material dimension from said measured property to said target property.

3. A method of maintaining a uniform profile thickness across a material width formed by an apparatus having a first pair of rolls between which the material passes and a second pair of rolls between which the material passes, said first pair of rolls having first actuator means for varying the spacing at one end of the rolls to control a first zone thickness and second actuator means for varying the spacing at the other end of said first pair of rolls to control a second zone thickness, and said second pair of rolls having third actuator means for varying one of the relative speed of and the equal spacing between the second pair of rolls, comprising the steps of,
   measuring the thickness in each of said first and second zones,
   comparing the measured thickness in each of said first and second zones,
   adjusting only one of said first and second actuator means to change the thickness in its respective zone to equal the measured thickness in the other of said zones,
   comparing the measured thickness in one of said zones with a target thickness,
   adjusting said third actuator means to change uniformly the thickness across the material width from said measured thickness in one of said zones to said target thickness.

4. Control apparatus for a regulator apparatus having means for separately regulating the property in an individual zone partially across a dimension of the material and means for uniformly regulating the property across the material dimension including said individual zone and an adjacent zone, the control apparatus comprising,
  gauge means for indicating the property in said individual and adjacent zones, and
  control means coupled to said gauge means to compare the indicated property in said individual and adjacent zones and to initiate a control action only by said separately regulating means that changes the property in said individual zone to make the indicated property in said individual zone substantially equal to the indicated property in said adjacent zone, and to compare the indicated property in one of said individual and adjacent zones with a target property and to initiate a control action by said uniformly regulating means that changes the property uniformly across the material dimension to said target property.

5. Apparatus, as described in claim 4, wherein,
said gauge means for indicating comprises two gauge means to be disposed adjacent different ones of said individual zones across the material dimension for producing output signals proportional to said property in said respective zones,
said control means comprises a first comparison means that receives the output signals from said gauge means and produces a control signal that is proportional to the inequality between said gauge means output signals to energize only said separately regulating means until the property in said zone is substantially equal to the property in said adjacent zone, and a second comparison means that receives the output signal from one of said gauge means and produces an output signal proportional to the inequality between said one output signal and a property target signal to energize said uniformly regulating means until the property across the material dimension is substantially equal to said target property.

6. Apparatus for maintaining a uniform profile thickness across a material width, comprising,
first means for separately changing the profile thickness in one zone of the material partially across the material width, and a second means for uniformly changing the profile thickness across the material width including said zone and an adjacent zone across the material width, the improvement comprising,
gauge means for indicating the material thickness in each of said zone and said adjacent zone,
means coupled to said gauge means for comparing the indicated material thicknesses and actuating only said first means until the indicated material thicknesses are substantially equal, and for comparing one of said indicated material thicknesses with a target thickness and actuating said second means until said one of said indicated material thicknesses is substantially equal to said target thickness.

7. Apparatus for maintaining a uniform material profile thickness, comprising a material forming apparatus having a first pair of rolls through which the material is to be passed and a first means for adjusting the spacing of the rolls at one end and a second means for adjusting the spacing of the rolls at the opposite roll ends, and a second pair of rolls displaced along the machine direction of the material through which the material is to be passed, and a third means for uniformly adjusting the roll spacing of one of said first and said second pair of rolls, the improvement comprising,
  gauge means for indicating the material thickness near opposite edges of the material,
  means coupled to said gauge means for comparing the indicated material thicknesses near said opposite edges and actuating only ones of said first and second means until the indicated material thicknesses are substantially equal, and for comparing one of said indicated material thicknesses with a target thickness and actuating said third means to adjust uniformly the roll spacing of one of said first and said second pair of rolls until said one of said indicated thicknesses is substantially equal to the target thickness.

8. Apparatus for maintaining a uniform material profile thickness, comprising,
a material forming apparatus having a first pair of rolls and a first means to adjust the spacing of the rolls at one end and a second means to adjust the spacing of the rolls at the opposite roll ends, and a second pair of rolls displaced along the machine direction of the material through which the material is to be passed, and a third means for adjusting the relative speed of said second pair of rolls to the speed of said first pair of rolls, the improvement comprising,
  gauge means for indicating the material thickness near opposite edges of the material,
  means coupled to said gauge means for comparing the indicated material thicknesses near said opposite edges and actuating one of said first and second means until the indicated material thicknesses are substantially equal, and for comparing one of said indicated material thicknesses with a target thickness and actuating said third means to adjust the relative speed of said second pair of rolls to the speed of said first pair of rolls until said one of said indicated material thicknesses is substantially equal to the target thickness.

9. Apparatus for maintaining a uniform profile thickness across a material width, comprising,
  first gauge means to be disposed for continuously measuring the property in one zone partially across the material width,
  second gauge means to be disposed for continuously measuring the property in another zone partially across the material width,
  first comparison means coupled to said first and second gauge means to indicate continuously the difference between the measured property in said zones,
  first means for separately varying the profile thickness of the material across the material width in said one zone,
  said first means being continuously actuated by the difference indication from said comparison means to maintain the material thickness in said one zone substantially equal to the material thickness in said another zone,
  second comparison means coupled to one of said first and second gauge means to continuously indicate the difference between a target thickness and the respective measured material thickness,
  second means for uniformly changing the profile thickness across the material width including said zones,
  said second means being continuously actuated by the difference indication from said second comparison means to maintain the material thickness substantially equal to said target thickness.

10. Apparatus for maintaining a uniform property across a material dimension, comprising,
  first and second gauge means for indicating the property in first and second zones respectively partially across the material dimension,
  comparison means coupled to said first and second gauge means for providing a first control signal indicating a difference between the property in the zones,
  first regulating means for separately varying the property in said first zone partially across the material dimension, being operable in one mode to increase progressively the property and in another mode to progressively decrease the property,
  said first regulating means being energized by said first control signal in whichever mode changes the property in said first zone to make the property indications substantially equal, second regulating means for uniformly varying the property across the material dimension including said zones, being operable in one mode to progressively increase the property and in another mode to progressively decrease the property, controller means coupled to one of said first and second gauge means for providing a second control signal indicating a difference between the respective property indication and a property target, said second regulator means being energized by said second control signal in whichever mode changes the property in the material to make the property indication from said one of said first and second gauge means substantially equal to the property target.

11. Apparatus for maintaining a uniform property across a material dimension, comprising, first gauge means for indicating the property in one zone across the material dimension, second gauge means for indicating the property in an adjacent zone across the material dimension, computer means for comparing the indications from said first and second gauges to indicate an inequality, error sensor means receiving said computer means indication of property inequality, first regulator means for separately varying the property in said first zone partially across the material dimension, second regulator means for separately varying the property in said adjacent zone partially across the material dimension, said error sensor means energizing only one of said first and second regulator means when the property indication from one of said first and second gauge means is greater than the indication from the other of said first and second gauge means to make the property indications substantially equal, and energizing only the other of said first and second regulator means when the property indication from the other of said first and second gauge means is greater than the indication from said one of said first and second gauge means to make the property indications substantially equal, third regulating means for uniformly varying the property across the material dimension including said first and second zones, being operable in one mode to progressively increase the property and in another mode to progressively decrease the property, controller means coupled to one of said first and second gauge means for providing a second control signal indicating an inequality between the respective property indication and a property target, said third regulator means being energized by said second control signal in whichever mode changes the property in the material to make the property indication from said one of said first and second gauge means substantially equal to the property target.

12. Apparatus, as described in claim 11, wherein, said error sensing means only energizes said first regulator means to increase the property in said first zone when the property in said first zone is less than the property in said adjacent zone, and only energizes said second regulator means to increase the property in said second zone when the property in said adjacent zone is less than the property in said first zone.

13. Apparatus, as described in claim 11, wherein, said error sensing means only energizes said first regulator means to decrease the property in said first zone when the property in said first zone is greater than the property in said adjacent zone, and only energizes said second regulator means to decrease the property in said second zone when the property in said second zone is greater than the property in said first zone.

14. Apparatus for maintaining a uniform property across a material dimension, comprising, first and second gauge means for indicating the property in first and second zones respectively across the material dimension, computer means coupled to said first and second gauge means for providing a first control signal proportional to the difference between the property indications for said zones, with one polarity corresponding to one of said zones having a greater property than the other zone and an opposite polarity corresponding to the other of said zones having a greater property than said one zone, first regulating means for separately varying the property in said first zone partially across the material dimension, being energized in one mode to increase progressively the property and in another mode to decrease progressively the property in said first zone, second regulating means for separately varying the property in said second zone partially across the material dimension, being operable in one mode in response to a control signal of one polarity to increase progressively the property and in another mode in response to a control signal of the opposite polarity to decrease progressively the property in said second zone, error sensing means receiving said first control signal and energizing said first regulating means only when said first control signal has one of said one polarity and opposite polarity and energizing said second regulating means only when said first control signal has the other of said one and said opposite polarity, said first and second regulator means being energized in the mode that acts to make the property in said zones substantially equal, for a given relationship of the property indication and the first control signal polarity, third regulator means for uniformly varying the property across the entire material dimension including said first and second zones, being operable in one mode to progressively increase the property and in another mode to progressively decrease the property, controller means coupled to one of said first and second gauge means for providing a second control signal indicating a difference between the respective property indication and a property target, said third regulator means being energized by said second control signal in whichever mode changes the property in the material to make the property indication from said one of said first and second gauge means substantially equal to the property target.

15. Apparatus for maintaining a uniform property across a material dimension, comprising, first radiation gauge for measuring the property in a first zone across the material dimension, first measuring servo coupled to said first radiation gauge, second radiation gauge for measuring the property in an adjacent zone across the material dimension, second measuring servo coupled to said second radiation gauge, first bridge means having first and second repeat slidewire potentiometers and a DC voltage source, said first measuring servo driving said first repeat slidewire potentiometer and said second measuring servo driving said second repeat slidewire potentiometer, said first and second repeat slidewire potentiometers having arms that are set at corresponding positions when the same property is being measured in said zones, an error sensor means having an input coupled between the arms of said first and second repeat slidewire potentiometers and comprising a first unidirectional signal responsive device for coupling a first control signal and a second unidirectional signal responsive device connected in the reverse direction for for coupling a second control signal, first regulator means for separately varying the property in said first zone partially across the material dimension, being energized in one mode to increase progressively the property and in another mode to decrease progressively the property in said first zone, second regulating means for separately varying the property in said adjacent zone partially across the material dimension, being energized in one mode to increase progressively the property and in another mode to decrease progressively the property in said adjacent zone, said first regulating means being energized by said first control signal, said second regulating means being energized by said second control signal, said first and second regulating means being energized in the mode that acts to make the property in said zones substantially equal for a given arrangement of repeat slidewire drives by said first and second measuring servos, a second bridge means comprising a third repeat slidewire potentiometer, a target potentiometer, a DC voltage source, one of said first and second measuring servos driving the arm of said third repeat slidewire potentiometer, and means coupled between the arm of said third repeat slidewire potentiometer and the arm of said target potentiometer to provide a third control signal, third regulating means for uniformly varying the property across the material dimension including said first and adjacent zones, being operable in one mode to progressively increase the property and in another mode to progressively decrease the property, said third regulating means being energized by said third control signal, said third control signal being energized in the mode that reduces said third control signal substantially to zero.

16. A method of maintaining a uniform property across a material dimension using apparatus having at least one control operable to vary separately the property in a zone partially across the material dimension and another control operable to vary uniformly the property across the material dimension including said zone and an adjacent zone, comprising the steps of, measuring the property in each of said zones, comparing the measured property in each of said zones, adjusting said at least one control to change the property in its respective zone to equal the property measured in said adjacent zone, comparing the measured property in one of said zones with a property target, adjusting said another control to change uniformly the property across the material dimension from said measured property to said target property, said steps of comparing said measured property and property target and said uniform property adjustment occur substantially simultaneous with said steps of property comparing in each zone and said respective zone property adjusting.

17. A method of maintaining a uniform property across a material dimension using apparatus having at least two controls each operable to vary separately the property in a different zone partially across the material dimension and another control operable to vary uniformly the property across the material dimension including each of said different zones, comprising the steps of, measuring the property in each of said zones, comparing the measured property in each of said zones, adjusting one of said at least two controls to change the property in its respective zone to equal the property measured in the other of said zones, comparing the measured property in one of said zones with a property target, adjusting said another control to change uniformly the property across the material dimension from said measured property to said target property, said steps of comparing said measured property and property target and said uniform property adjustment occur substantially simultaneous with said steps of property comparing in each zone and said respective zone property adjusting.

18. A method of maintaining a uniform profile thickness across a material width formed by an apparatus having a first pair of rolls between which the material passes and a second pair of rolls between which the material passes, said first pair of rolls having first actuator means for varying the spacing at one end of the rolls and second actuator means for varying the spacing at the other end of said first pair of rolls, and said second pair of rolls having third actuator means for varying one of the relative speed of said second pair of rolls and the spacing equally between the second pair of rolls, comprising the steps of, measuring the thickness in each of said zones, comparing the measured thickness in each of said zones, adjusting one of said first and second actuator means to change the thickness in its respective zone to equal the measured thickness in the other of said zones, comparing the measured thickness in one of said zones with a target thickness, adjusting said third actuator means to change uniformly the thickness across the material width from said measured thickness in one of said zones to said target thickness, said steps of comparing said measured thickness and target thickness and said uniform thickness adjustment occur substantially simultaneous with said steps of thickness comparing in each zone and said respective zone thickness adjusting.

References Cited

UNITED STATES PATENTS

| | | | |
|---|---|---|---|
| 2,792,730 | 5/1957 | Cozzo | 72—12 |
| 2,903,926 | 9/1959 | Reichl | 72—240 |
| 3,006,225 | 10/1961 | Mamas | 72—12 |
| 3,081,651 | 3/1963 | Roberts | 72—9 |
| 3,213,655 | 10/1965 | Reid | 72—11 |
| 3,228,219 | 1/1966 | Fox | 72—16 |

FOREIGN PATENTS 688,132   6/1964   Canada.

CHARLES W. LANHAM, *Primary Examiner.*

A. RUDERMAN, *Assistant Examiner.*

U.S. Cl. X.R.

72—11, 16